Sept. 29, 1964     J. W. HEIMASTER ETAL     3,150,519
EARTH STRATA-HARDNESS SENSING SYSTEMS
Filed April 10, 1961                                4 Sheets-Sheet 1

INVENTORS.
JOHN W. HEIMASTER
FRANK W. JENKINS
ROY L. McNEILL
BY
Barnwell R. King
ATTORNEY Sept. 29, 1964   J. W. HEIMASTER ETAL   3,150,519
EARTH STRATA-HARDNESS SENSING SYSTEMS
Filed April 10, 1961   4 Sheets-Sheet 2

INVENTORS.
JOHN W. HEIMASTER
FRANK W. JENKINS
ROY L. McNEILL
BY
Barnwell R. King
ATTORNEY Sept. 29, 1964 J. W. HEIMASTER ETAL 3,150,519
EARTH STRATA-HARDNESS SENSING SYSTEMS
Filed April 10, 1961 4 Sheets-Sheet 3
FIG. 6
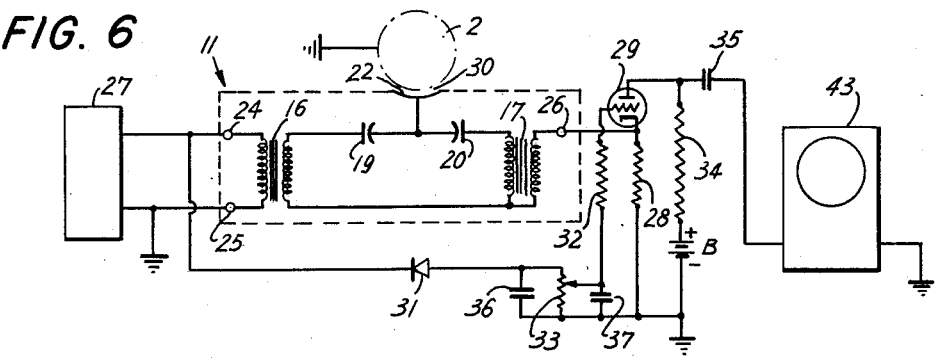
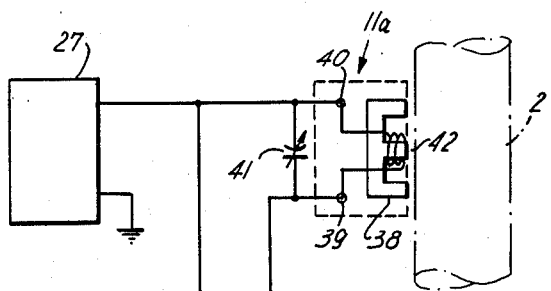
FIG. 8
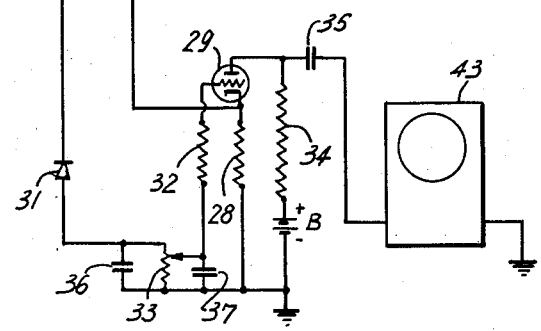
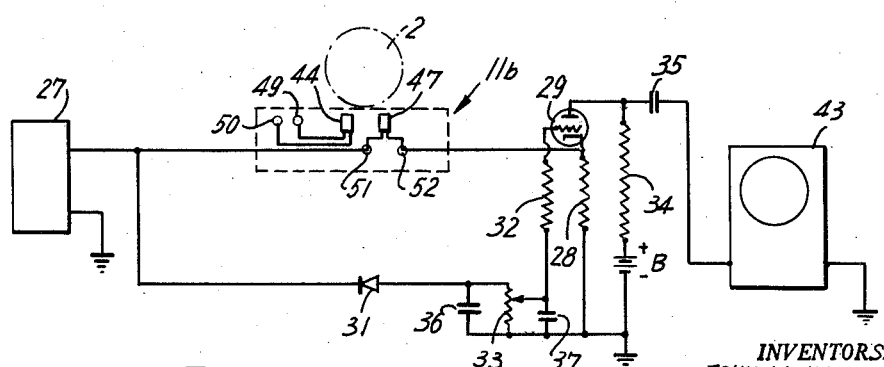
FIG. 10
INVENTORS.
JOHN W. HEIMASTER
FRANK W. JENKINS
ROY L. McNEILL
BY Barnwell R. King
ATTORNEY Sept. 29, 1964    J. W. HEIMASTER ETAL    3,150,519
EARTH STRATA-HARDNESS SENSING SYSTEMS
Filed April 10, 1961    4 Sheets—Sheet 4

INVENTORS.
JOHN W. HEIMASTER
FRANK W. JENKINS
ROY L. McNEILL
BY Barnwell R. King
ATTORNEY

United States Patent Office 3,150,519
Patented Sept. 29, 1964

3,150,519
EARTH STRATA-HARDNESS SENSING SYSTEMS
John W. Heimaster, Charleston, Frank W. Jenkins, Nitro, and Roy L. McNeill, Charleston, W. Va., assignors to Union Carbide Corporation, a corporation of New York
Filed Apr. 10, 1961, Ser. No. 101,769
11 Claims. (Cl. 73—78)

This invention relates to earth strata-hardness responsive devices, and more particularly to continuously responsive strata-hardness-sensing systems for continuous mining machines.

The invention provides a strata-hardness responsive device for mining machines, comprising a housing, a resilient beam affixed to said housing in such manner as to deflect substantially only in bending, a strata cutting tooth transversely affixed to such resilient means for imparting substantially only bending motion thereto, and pick-up means for converting such bending motion into electrical signals.

In U.S. Patent No. 2,752,591 there is disclosed a system for continuously indicating the relative hardness of strata being cut by a continuous mining machine, such as that shown in Patent No. 2,862,402, in which the relative torque or force applied to a strata cutting tooth in cutting in situ earth materials of different hardness caused relative mechanical movement. Such movement was converted to electrical signals which corresponded to the relative hardness of the earth strata being cut. Such prior device contained a multitude of parts, such as bearings, levers, springs, etc., some of which had to move quite rapidly, generating high inertia forces.

The main objects of the present invention are to simplify the construction, lower the maintenance costs, and minimize the inertia forces. Another object is to provide an earth strata-hardness system that is more efficient and effective than any known to the prior art, is easy to service and maintain, and may be applied to existing mining machines.

According to this invention such objects are accomplished and new and unexpected results are obtained by mounting the strata cutting tooth near the free end of a cantilever beam, such that the force applied to the strata cutting tooth in cutting in situ earth materials of different hardness causes only relative bending deflection of the beam, which is picked-up directly by suitable electrical means and thereby indicated at a control station. Torsional deflection of the beam about its axis is eliminated. Thus, many parts are eliminated, such as bearings, levers, and springs, and inertia forces are kept low.

More specifically the invention provides the combination with a continuous mining machine having a rotary head provided with a radial arm, of a forwardly extending housing carried on the outer reach of said arm, said housing having an elongated hole extending from end-to-end thereof and a socket extending laterally into such hole from one side of the said housing, a motion pick-up assembly comprising a stator mounted in said socket, said pick-up assembly including an armature in the form of a round beam secured at the rear end only in said elongated hole to stop any rotation of such beam on its own longitudinal axis in said housing, but permitting simple bending flexure of its free end which is provided with a transverse slot, and a strata-cutting tooth rigidly secured in said slot and extending radially of said head beyond said housing for relatively bending said beam in response to the hardness of the strata actually being cut thereby as said head rotates, operating the pick-up in response thereto. Said pick-up stator is provided with an electrical circuit including a remotely located oscilloscope having a rotary trace the rotation of which is synchronized with the rotation of said mining machine head, and the radius of which is responsive to the amplitude of the bending of said beam which is responsive, in turn, to the relative hardness of the earth strata actually being cut by said tooth as the head rotates.

In the drawings:

FIG. 6 is a wiring diagram of the pick-up assembly and its associated circuitry at a remote station;

FIG. 8 is a wiring diagram of such pick-up modification with its associated circuitry;

FIG. 10 is a circuit diagram of the pick-up assembly shown in FIG. 9;

Figure 1:
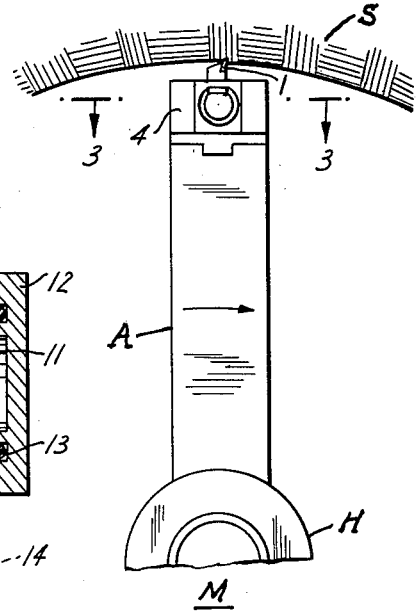
FIGS. 1 and 2 are front elevational and side elevational views, respectively, of a cutting head provided with a preferred modification of the invention.
Figure 2:
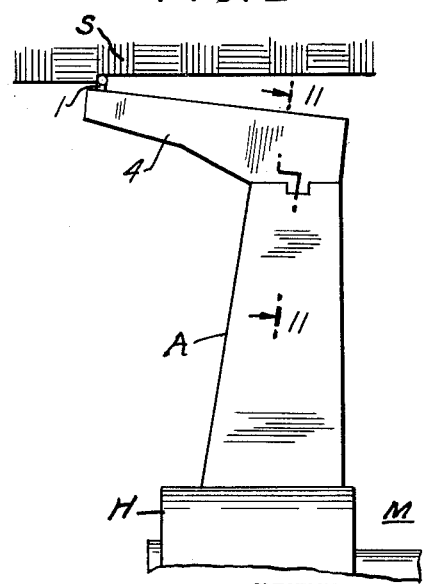

As shown in FIGS. 1 and 2, strata cutting tooth 1 is rigidly mounted near the outer end of cantilever beam 2. The resistance of the earth strata being cut produces bending, torsional and axial loads in the cantilever beam 2.

Figure 3:
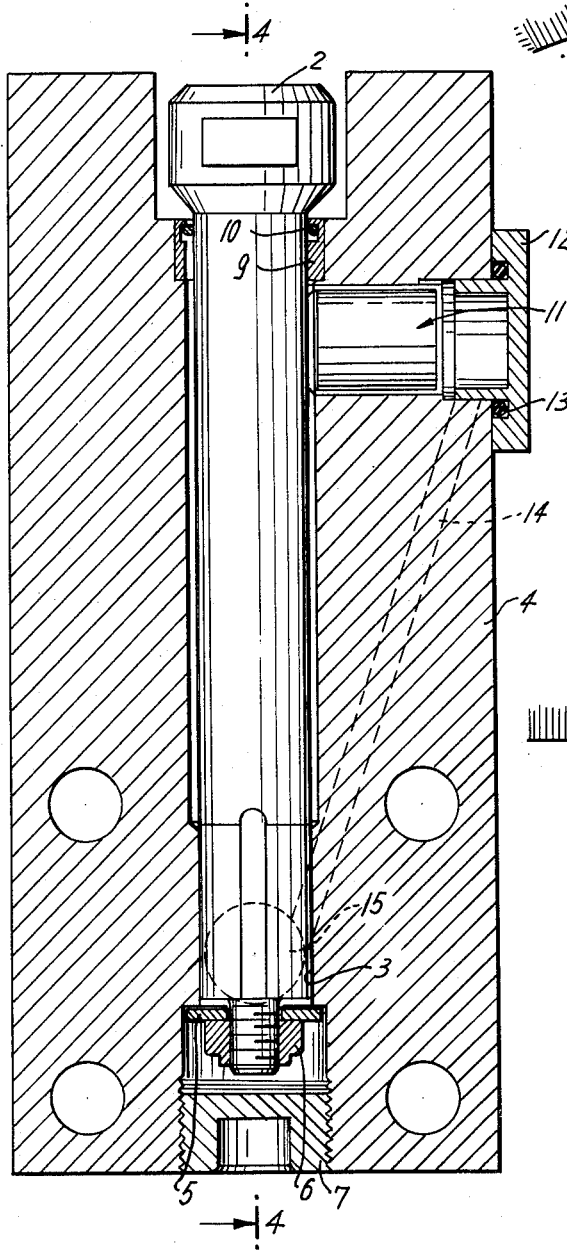
FIG. 3 is an enlarged cross-sectional view taken on line 3—3 of FIG. 1.

As shown in FIG. 3, however, axial loads are resisted by the wall of tapered socket 3 in housing 4 in which the tapered inner end of cantilever beam 2 is mounted. Housing 4 is carried on the outer reach of an arm A on the rotary head H of a continuous mining machine M. Washer 5 and nut 6 restrain beam 2 from being dislodged by axial loads in the reverse direction. Plug 7 seals against the entrance of dirt and water.

The maximum bending deflection of cantilever beam 2 is limited by the clearance between the outside diameter of beam 2 and the inside diameter of a stop bushing 9. A rubber ring 10 seals against the entrance of dirt and water adjacent the outer end portion of beam 2, without limiting its bending deflection. A pick-up assembly 11 senses the magnitude of deflection of beam 2, and transmits such information electrically to a remote station. This deflection is directly responsive of the relative hardness of the strata being cut by strata cutting tooth 1.

Cover 12 and gasket 13 serve to protect the pick-up assembly from abrasion and the entrance of dirt and water. Hole 14 in housing 4 serves as a conduit for electrical wires from pick-up assembly 11 to a cavity 15, from whence they lead to a remote station.

Figure 4:
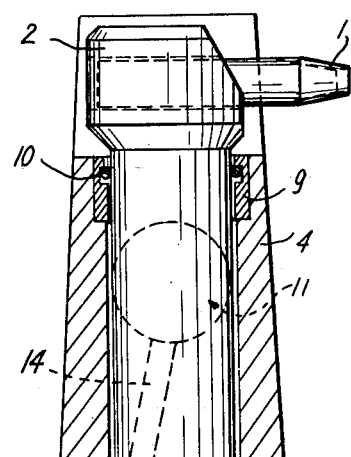
FIG. 4 is a cross-sectional view taken of the line 4—4 of FIG. 3.

As shown in FIG. 4, keys 8 are provided in suitable ways to rest torsional loads imposed on beam 2 by the cutting action of strata cutting tooth 1.

Figure 5:
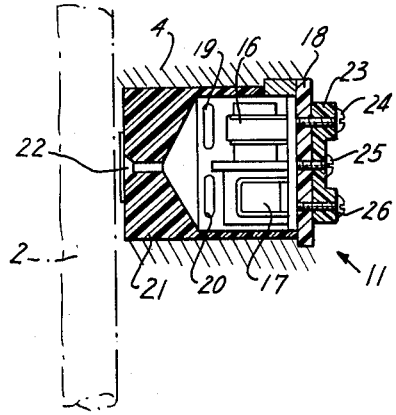
FIG. 5 is a cross-sectional view of a pick-up assembly.

As shown in FIG. 5, pick-up assembly 11 comprises transformers 16 and 17, mounted on plastic base plate 18. Capacitors 19 and 20 are mounted upon the transformers, and the whole encased in plastic housing 21. Capacitor plate 22 is cemented to the end of housing 21 opposite to base plate 18. Plastic terminal strip 23 is cemented to base plate 18, carrying terminals 24, 25, and 26.

The terminals 24 and 25, FIG. 6, are connected to the output terminals of an audio frequency oscillator 27.

The output voltage of the oscillator 27 is stepped up by transformer 16 to a relatively high value, consistent with the insulation on such transformer. This voltage is applied to a voltage divider network including capacitors 19 and 20, and a capacitor formed by capacitor plate 22 and cantilever beam 2, through step down transformer 17 to terminal 26. Voltage from such network is applied to resistor 28 in the cathode circuit of vacuum tube 29, both located at the remote station, and thence to ground.

Bending of cantilever beam 2 as a result of the loads imposed on strata cutting tooth 1 changes air gap 30 between beam 2 and capacitor plate 22, thus changing its capacitance in direct ratio to the hardness of the earth strata being cut by cutter bit 1. This change in capacitance causes more or less of the output voltage from the oscillator to be bled off to ground, thus changing the amount reaching terminal 26 and cathode resistor 28 of vacuum tube 29.

Bias for the grid of tube 29 is provided by rectifying a portion of the output of oscillator 27 by means of rectifier 31. The bias potential is adjusted by means of potentiometer 33 and resistor 32, such that vacuum tube 29 does not conduct when cantilever beam 2 is not deflected. Thus, only the changes in the amount of voltage reaching terminal 26 are amplified. Using the oscillator as the source of bias voltage tends to neutralize the effects of random changes in oscillator output. Capacitors 36 and 37 serve to increase the potential across resistor 33.

The plate circuit of vacuum tube 29 receives its power from battery B through plate resistor 34. Capacitor 35 couples the resulting amplified and clipped voltage from the sensing assembly to an oscilloscope 43, where it appears as a visible trace upon its screen. Thus, the relative amplitude of the signal reproduced on the screen of the oscilloscope 43 is a direct indication of the hardness of the particular earth stratum actually being cut by the cutter tooth 1 at any given instant. This signal is used to guide the forward progress of the continuous mining machine M.

Figure 7:
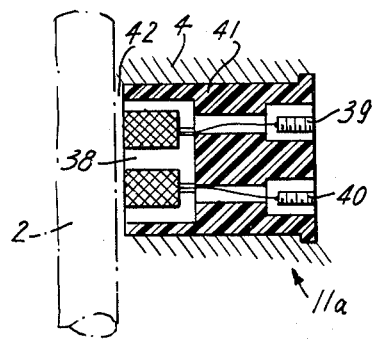
FIG. 7 is a cross-sectional view of a preferred modification of the pick-up assembly.
Figure 7:
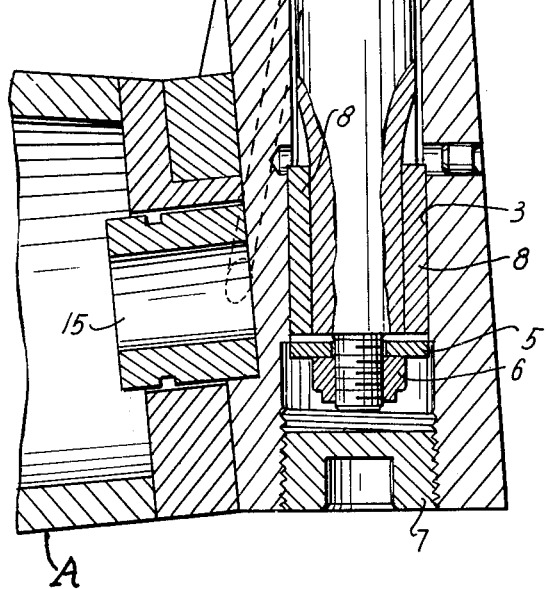

FIG. 7 shows another pick-up assembly 11a in which an inductor 38, with an E-shaped laminated iron core, and terminals 39 and 40 are encased in a cast-plastic block 41 such that when the assembly is mounted in housing 4 a narrow air gap 42 exists between the open end of the E-shaped laminations and the outside of cantilever beam 2.

As shown in the wiring diagram, FIG. 8, current flows from one terminal of audio frequency oscillator 27 to terminal 40, through inductor 38 to terminal 39, thence through resistor 28 to ground. A variable capacitor 41 is connected in shunt with the inductor 38 to reduce the value of the no-load current.

The path for the magnetic lines of force generated in the center leg of the E-shaped iron core of inductor 38 by the passage of current therethrough is completed through cantilever beam 2, across air gap 42. The major reluctanc in this magnetic path is in the air gap, since the relative magnetic permeability of the iron is about one thousand times that of air. Therefore, a small change in the length of the air gap causes a significant change in the number of lines of force generated in the E-shaped core. Such change in the number of lines of force in the iron, or its degree of saturation, changes the impedance of the inductor, which in turn changes the current flowing in the circuit. The change in voltage drop across resistor 28, as a result of the change of current flowing, is shown on the screen of oscilloscope 43 as a change in amplitude of the trace appearing thereon.

Bending of cantilever beam 2 as a result of the loads imposed on strata cutting tooth 1 changes the length of air gap 42, thus inducing changes in the amplitude of the trace appearing on the oscilloscope screen. Thus, the relative amplitude of the trace appearing on the screen of the oscilloscope is a direct indication of the hardness of the particular earth stratum being cut by the strata cutting tooth at any given instant.

Figure 9:
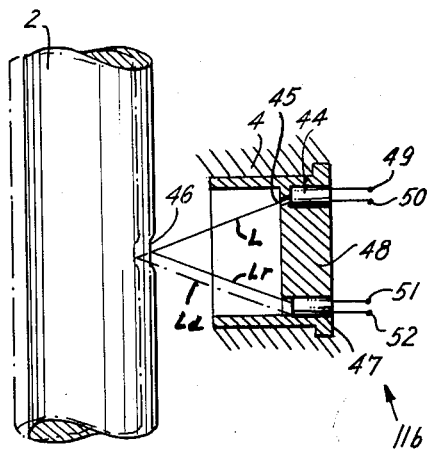
FIG. 9 is a fragmentary view partly in plan and partly in cross-section of another pick-up assembly.

FIG. 9 shows still another form of pick-up assembly 11b in which light from a lamp 44 passes through slit 45 in a plug 48 and strikes a mirror 46, which may be merely a polished spot on beam 2, and is reflected to a photo-conductive cell 47. Lamp 44, and photo-conductive cell 47 are mounted, as shown, in plug 48, and are provided with electrical terminals 49, 50, 51, and 52.

Bending of beam 2 as a result of loads imposed on strata cutting tooth 1 changes the position of mirror 46. A light ray L from slit 45 strikes the mirror at a different point, depending on the distance which it is displaced from the neutral or no-load position. The point at which the reflected light ray Lr strikes photo-conductive cell 47 is in turn displaced by an amount proportional to the displacement of the mirror. Photo-conductive cell 47 is so constructed and mounted that the reflected beam Lr of light falls upon an inactive area of the cell when beam 2 is in the neutral position. FIG. 9 shows an exaggerated picture of the path Ld of the reflected beam of light when the mirror has been displaced due to bending of beam 2.

The wiring diagram, FIG. 10, of the pick-up assembly 11b of FIG. 9, includes leads 49 and 50 connected to any suitable source of power to energize the filament of lamp 44. Current from one side of audio frequency oscillator 27 flows to terminal 51, through photo-conductive cell 47, to terminal 52, to cathode resistor 28, and to ground.

Bending of cantilever beam 2 as a result of loads imposed by strata cutting tooth 1 changes the amount of light reaching photo-conductive cell 47, thus changing its resistance in direct ratio to the amount of bending. This change in resistance induces changes in the voltage drop across cathode resistor 28, thus inducing changes in the amplitude of the trace appearing on the screen of oscilloscope 43. Thus, the relative amplitude of the trace on the oscilloscope screen provides a direct and continuous indication of the hardness of the particular earth stratum being cut at any given instant.

Figure 11:
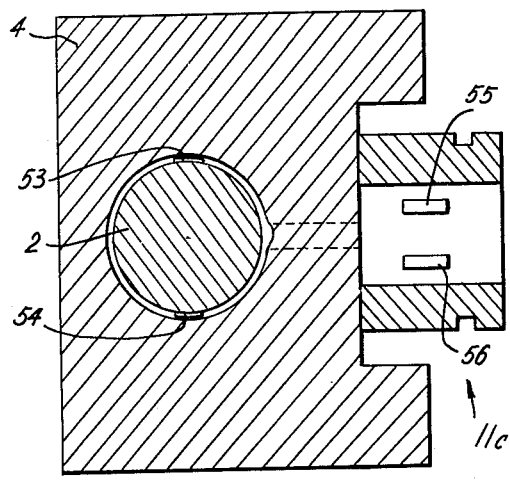
FIG. 11 is a view mainly in cross-section taken on line 11—11 of FIG. 2, of still another form of pick-up assembly.
Figure 12:
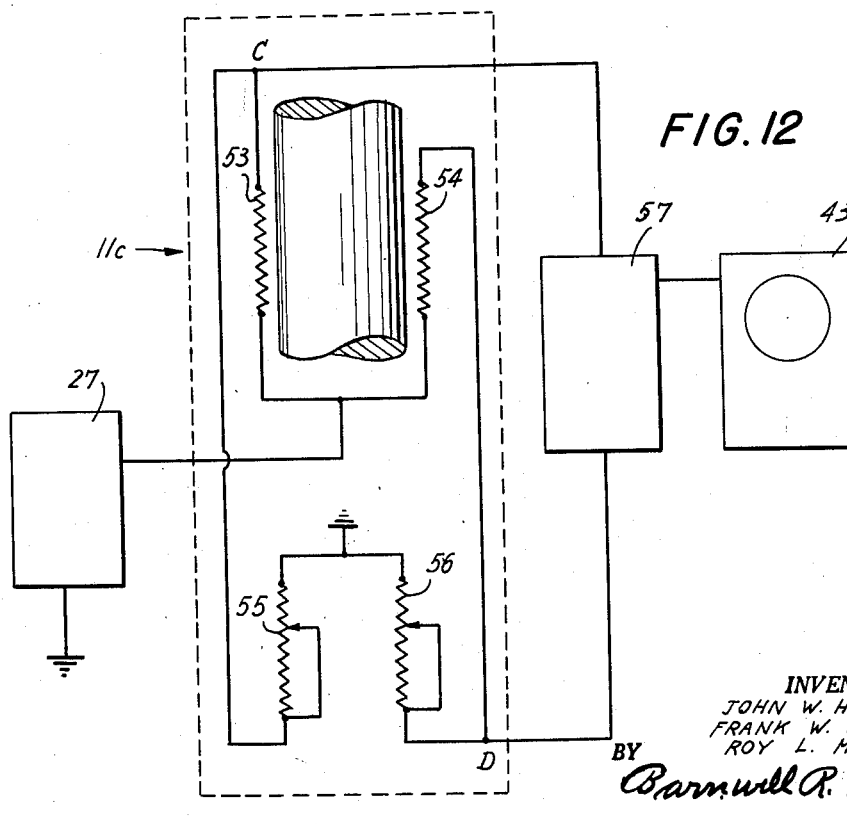
FIG. 12 is a circuit diagram of the pick-up assembly shown in FIG. 11.

FIG. 11 shows still another form of pick-up assembly 11c. Strain gages 53 and 54 are cemented on opposite sides of beam 2 such that any bending of beam 2 in response to the loads imposed by strata cutting tooth 1, causes strain gage 53 to be elongated and strain gage 54 to be compressed in direct ratio to the imposed loads. This causes the resistance of strain gage 53 to increase, and that of strain gage 54 to decrease. Variable resistors 55 and 56 are provided in a bridge type circuit, FIG. 12, to balance the no-load resistance of strain gages 53 and 54.

Current from audio frequency oscillator 27 branches and part flows through strain gage 53 and variable resistor 55, and part through strain gage 54 and variable resistor 56 to ground. Variable resistors 55 and 56 are adjusted so that no difference in potential exists between points C and D of the bridge when cantilever beam 2 is unloaded. The potential difference, if any, between points C and D is amplified by a conventional amplifier 57, and applied across the input of oscilloscope 43.

Bending of cantilever beam 2 due to loads imposed by strata cutting tooth 1, causes strain gage 53 to elongate, and strain gage 54 to shorten. The change in resistance of gages 53 and 54 unbalances the bridge circuit, causing a difference in potential to exist across points C and D of the bridge. This difference in potential is amplified and shown on the screen of the oscilloscope 43. Thus, the relative amplitude of the trace appearing on the screen of the oscilloscope provides a continuous and synchronous indication of the relative hardness of the particular earth stratum being cut by the strata cutting tooth.

The modification of the sensing element or pick-up assembly which operates upon the principle of a change in the reluctance of a magnetic circuit is preferred because it is less affected by the entrance of dirt or water.

The modifications shown in FIGS. 5, 6, 7, and 8 have an advantage of producing a nonlinear output, i.e., a modest change in the hardness of the earth stratum being cut produces a major change in the electrical output.

The invention includes a simple beam as well as a cantilever beam which latter, however, is preferred because of its greater simplicity in mounting.

What is claim is:

1. An earth strata-hardness sensing system comprising the combination with a continuous mining machine having a rotary head provided with a radial arm, a housing carried on the outer reach of said arm, said housing having an elongated hole extending inwardly from at least one end thereof and a socket extending laterally toward such hole in said housing, a motion pick-up assembly comprising a stator mounted in said socket, said pick-up assembly including an armature in the form of a resilient beam affixed at one end only to said housing in such manner as to deflect substantially only in bending, means for preventing rotary motion of said beam with respect to said housing, a strata cutting tooth transversely affixed to such resilient beam for imparting substantially only bending motion thereto, said tooth extending radially of said head beyond said housing for relatively bending said beam transversely in response to the hardness of the strata actually being cut thereby as said head rotates, operating the pick-up in response thereto.

2. A strata-hardness responsive device as claimed in claim 1, in which said pick-up means for converting bending motion to electrical signals includes a variable capacitance.

3. A strata-hardness responsive device as claimed in claim 1, in which said pick-up means for converting such bending motion to electrical signals includes a magnetic circuit of variable reluctance.

4. A strata-hardness responsive device as claimed in claim 1, in which said pick-up means for converting such bending motion to electrical signals includes a variable inductance.

5. A strata-hardness responsive device as claimed in claim 1, in which said pick-up means for converting such bending motion to electrical signals comprises at least one strain gage.

6. A strata-hardness responsive device, as claimed in claim 1, in which said pick-up means for converting such bending motion to electrical signals comprises a light source, light reflecting means on said resilient beam, and photo-electrical means responsive to the amount of light reflected thereon by said light reflecting means.

7. A strata-hardness responsive device, as claimed in claim 1, in which said resilient beam is affixed at one end to said housing, and said tooth is affixed to said beam at the other end thereof.

8. A strata-hardness responsive device, as claimed in claim 1, in which said pick-up means for converting such bending motion to electrical signals has a nonlinear output.

9. An earth strata-hardness sensing system comprising the combination with a continuous mining machine having a rotary head provided with a radial arm, a housing attached to the outer reach of said arm, a beam fixed to said housing for substantially only bending deflection, means for preventing rotary motion of said beam with respect to said housing, a strata cutting tooth transversely fixed to said beam for imparting transverse bending motion thereto, said tooth extending radially of said head beyond said housing for so-bending said beam transversely in response to the hardness of the strata actually being cut thereby as said head rotates, means located in said housing for converting such bending motion into electrical signals, means for transmitting such signals to a point remote from said housing, and means for indicating the relative amplitude of such signals at such remote point.

10. An earth strata-hardness sensing system comprising the combination with a continuous mining machine having a rotary head provided with a radial arm, a housing carried on the outer reach of said arm, said housing having an elongated hole extending from end-to-end thereof and a socket extending laterally into such hole from one side of the said housing, a motion pick-up assembly comprising a stator mounted in said socket, said pick-up assembly including an armature in the form of a round beam secured at one end only in said elongated hole to stop any rotation of such beam on its own longitudinal axis in said housing, but permitting simple bending flexure of its free end which is provided with a transverse slot, and a strata-cutting tooth rigidly secured in said slot and extending radially of said head beyond said housing for relatively bending said beam in response to the hardness of the strata actually being cut thereby as said head rotates, operating the pick-up in response thereto.

11. An earth strata-hardness sensing system as defined by claim 10, in which said pick-up stator is provided with an electrical circuit including a remotely located oscilloscope having a rotary trace the rotation of which is synchronized with the rotation of said mining machine head, and the radius of which is responsive to the amplitude of the bending of said beam which is responsive, in turn, to the relative hardness of the earth strata actually being cut by said tooth as the head rotates.

References Cited in the file of this patent

UNITED STATES PATENTS

| | | |
|---|---|---|
| 2,329,541 | Kuehni | Sept. 14, 1943 |
| 2,360,639 | Asimow et al. | Oct. 17, 1944 |
| 2,752,591 | Felbeck et al. | June 26, 1956 |
| 3,056,952 | Heimaster et al. | Oct. 2, 1962 |

UNITED STATES PATENT OFFICE
CERTIFICATE OF CORRECTION

Patent No. 3,150,519                            September 29, 1964

John W. Heimaster et al.

It is hereby certified that error appears in the above numbered patent requiring correction and that the said Letters Patent should read as corrected below.

Column 1, line 25, for "2,862,402" read -- 2,826,402 --; column 5, line 14, and column 6, lines 7 and 24, after "radial arm,", each occurrence, insert -- of --.

Signed and sealed this 24th day of August 1965.

(SEAL)
Attest:

ERNEST W. SWIDER                                  EDWARD J. BRENNER
Attesting Officer                                      Commissioner of Patents